United States Patent [19]

Takeda et al.

[11] Patent Number: 4,593,338

[45] Date of Patent: Jun. 3, 1986

[54] CONSTANT-VOLTAGE POWER SUPPLY CIRCUIT

[75] Inventors: Koji Takeda; Takeshi Sugimoto; Yusuke Yamada, all of Itami, Japan

[73] Assignee: Mitsubishi Denki Kabushiki Kaisha, Tokyo, Japan

[21] Appl. No.: 608,577

[22] Filed: May 4, 1984

[30] Foreign Application Priority Data

Jun. 15, 1983 [JP] Japan ............................... 58-108636

[51] Int. Cl.[4] ............................................... H02H 7/00

[52] U.S. Cl. ........................................ 361/18; 361/28; 361/115; 323/275; 323/314; 323/907

[58] Field of Search .......................... 361/18, 88, 115; 323/273, 275, 907, 313, 314

[56] References Cited

U.S. PATENT DOCUMENTS

| | | | |
|---|---|---|---|
| 3,078,410 | 9/1959 | Thomas | 361/18 |
| 3,391,330 | 10/1965 | Grossoehme | 323/277 |
| 3,939,399 | 2/1976 | Funatsu et al. | 323/275 |
| 4,263,544 | 4/1981 | Groendijk | 323/907 |

*Primary Examiner*—Harry E. Moose, Jr.
*Assistant Examiner*—Derek S. Jennings
*Attorney, Agent, or Firm*—Lowe King Price & Becker

[57] ABSTRACT

A control transistor (3) is connected between a power supply terminal (1) and an output terminal (19). The base bias of the control transistor (3) is controlled by bias control transistors (12, 13), thereby the output voltage is maintained at a constant value. An overcurrent state is detected by a current control detecting transistor (22), and the base bias of the control transistor (3) is controlled by the bias control transistors (12, 13), so as to prevent the overcurrent. The current control detecting transistor (22) further detects the time when the potential of the output terminal (19) becomes approximately 0 V by, e.g., short-circuiting of a load, so as to control the base bias of the control transistor (3) through the bias control transistors (12, 13), thereby the current to the load is decreased to a value considerably smaller than a limited value for preventing the overcurrent.

11 Claims, 2 Drawing Figures

CONSTANT-VOLTAGE POWER SUPPLY CIRCUIT

BACKGROUND OF THE INVENTION

1. Field of the Invention

The present invention relates to a constant-voltage power supply circuit which controls a power supply voltage to be applied to a load to a set constant voltage, and more particularly, it relates to an improvement in a current limiting protection circuit for limiting flowing of an overcurrent to a transistor which controls the power supply voltage at the constant voltage and protecting the same.

2. Description of the Prior Art

FIG. 1 shows an example of a conventional constant-voltage power supply circuit. In the drawing, a power source is applied to an input terminal 1. A PNP transistor 3 for controlling the power supply voltage has an emitter connected to the input terminal 1, a collector connected to an output terminal 19 and a base connected to the emitter through a resistor 2 as well as grounded through a constant-current circuit 4 and a reference voltage source 5 in a series manner. PNP transistors 6 and 7 have their bases and emitters connected in common with each other. The common-connected emitters are connected to a junction between the base of the PNP transistor 3 and the resistor 2 and the constant-current circuit 4. The base and the collector of the PNP transistor 6 are connected in common. The emitters of NPN transistors 8 and 9 are connected in common, and the junction therebetween is grounded through an emitter resistance 10. The NPN transistors 8, 9 and the emitter resistor 10 form an error amplification circuit 11. The collector of the NPN transistor 8 is connected to the collector of the PNP transistor 6. The base of the NPN transistor 8 is connected to the junction between the constant-current circuit 4 and the reference voltage source 5. The collector of the NPN transistor 9 is connected to the collector of the PNP transistor 7. The base of the NPN transistor 9 is connected to an output regulating terminal 20 which is a junction between resistors 16 and 17 connected in series between the output terminal 19 and a ground 18. The voltage applied to a load 21 is detected by the NPN transistor 9 in the error amplification circuit 11 and the PNP transistor 7, so that the base bias of the control PNP transistor 3 is changed, thereby to stabilize the voltage applied to the load 21.

The control NPN transistors 12 and 13 are interconnected in a Darlington connection manner, and the common-connected collectors thereof are connected to the junction between the base of the control PNP transistor 3, the resistor 2 and the constant-current circuit 4. The base of the NPN transistor 12 is connected to the collector of the PNP transistor 7, while the emitter of the NPN transistor 13 is grounded through a resistor 14 which detects the current flowing to the NPN transistor 13. The collector of a current limitation detecting NPN transistor 15 is connected to the collector of the PNP transistor 7, and the base and the emitter of the NPN transistor 15 are connected to both ends of the resistor 14. The load 21 is connected between the output terminal 19 and the ground 18.

When, in the aforementioned construction, a constant and stabilized voltage $V_{ref}$ is fed to the base of one NPN transistor 8 in the error amplification circuit 11 while the base of the other NPN transistor 9 is supplied with a voltage divided by the resistors 16 and 17 from an output voltage $V_0$ at both ends of the load 21, the error amplification circuit 11 compares the two voltages so as to control the control PNP transistor 3 such that the difference therebetween becomes zero, thereby maintaining the output voltage constant. Assuming here that the base-to-emitter voltage $V_{BE}$ of the NPN transistors 8 and 9 are equal and the resistance values of the resistors 16 and 17 are respectively represented by $R_{16}$ and $R_{17}$ while the voltage value of the reference voltage source 5 is represented by $V_{ref}$, the output voltage $V_0$ can be set as follows:

$$V_0 = V_{ref}\frac{R_{16} + R_{17}}{R_{17}}$$

The change in the output voltage $V_0$ is divided by the resistors 16 and 17 and is fed to the base of the NPN transistor 9 in the error amplification circuit 11, to be compared with the voltage $V_{ref}$ at the reference voltage source 5, and the change is thus detected. For example, when the output voltage $V_0$ is changed to a higher value, the changed voltage is divided by the resistors 16 and 17, and thereby the base potential of the NPN transistor 9 in the error amplification circuit 11 is increased, leading to increase in the collector current of the NPN transistor 9. Thus, the base current to the Darlington-connected control NPN transistors 12 and 13 is reduced, leading to decrease in the collector current of the Darlington-connected control transistors 12 and 13, and the base current of the control PNP transistor 3 is reduced. By virtue of this, the collector potential of the PNP transistor 3, i.e., the output voltage $V_0$ is reduced. When, to the contrary, the output voltage $V_0$ is lowered, the error amplifiction circuit 11 operates the other way to the above to raise the output voltage $V_0$. Thus, the Darlington-connected control transistors 12 and 13 and the control PNP transistor 3 are controlled such that the base potential of the NPN transistor 9 is made equal to the voltage $V_{ref}$ at the reference voltage source 5, thereby maintaining the output voltage constant against change in the input voltage and load change.

The resistor 14 for detecting the current is connected between the base and the emitters of the current limitation detecting NPN transistor 15. When the voltage produced by the current flowing to the resistor 14 exceeds a predetermined value, the NPN transistor 15 is turned on, thereby controlling the current flowing to the NPN transistors 12 and 13 for controlling the base bias of the transistor 3. Thus, current limiting protection is applied so that the transistor 3 is not subjected to an overcurrent exceeding a predetermined set value.

In the aforementioned current limiting protective circuit, the transistor 3 for controlling the power supply voltage to the load at constant can be prevented from being subjected to an overcurrent. However, under an extraordinary condition such that the load is short-circuited, the conventional detection circuit consisting of the transistor 15 and the resistor 14 for preventing flowing of an overcurrent to the transistor 3 may not sufficiently protect the transistor 3. In other words, even in a case the load is short-circuited, the detection circuit merely performs the current limiting protective operation identical to the above overcurrent limiting operation. Therefore, in this case, the collector current of the transistor 13 is fed as the base current of the control PNP transistor 3, whose collector current in turn flows being amplified to a value multiplied by d.c. forward current transfer ratio $h_{FE}$ (=collector current/base current) of the control PNP transistor 3. Thus, a remarkably large electric power is applied to the control PNP transistor 3, which in the result is damaged.

SUMMARY OF THE INVENTION

The present invention is directed to a constant-voltage power supply circuit including an improved current limiting protective circuit. The constant-voltage power supply circuit according to the present invention comprises a power supply terminal connected to a power source, a load terminal connected to a load, a control transistor connected between the power supply terminal and the load terminal for feeding the load with a controlled load current, a voltage stabilization means for changing the base bias of the control transistor in response to the voltage applied to the load thereby stabilizing the voltage applied to the load and a current control means for detecting the time when the load current flowing to the control transistor exceeds a predetermined current value thereby controlling the current value not to exceed the predetermined current value, and the current control means is adapted to detect the time when the potential of the load terminal is decreased to a predetermined potential value and change the base bias of the control transistor, thereby to decrease the load current to a current value under the predetermined current value.

Accordingly, an object of the present invention is to provide a constant-voltage power supply circuit which can effectively prevent a control transistor from being damaged by effectively reducing the current flowing to the control transistor even when the voltage at the connecting terminal of a load is reduced approximately to 0 V such in a case that the load is short-circuited.

This object and other objects, features, aspects and advantages of the present invention will become more apparent from the following detailed description of the present invention when taken in conjunction with the accompanying drawings.

DESCRIPTION OF THE PREFERRED EMBODIMENT

A preferred embodiment of the present invention is hereafter described in detail with reference to the accompanying drawings.

Figure 1:
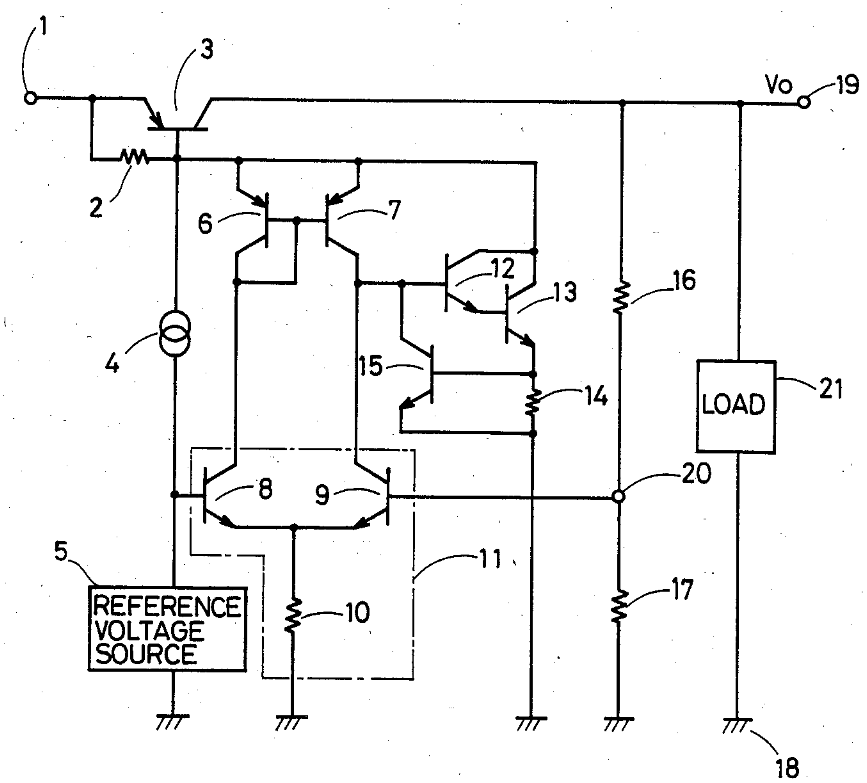
FIG. 1 PRIOR ART
FIG. 1 is a circuit diagram showing an example of a conventional constant-voltage power supply circuit.
Figure 2:
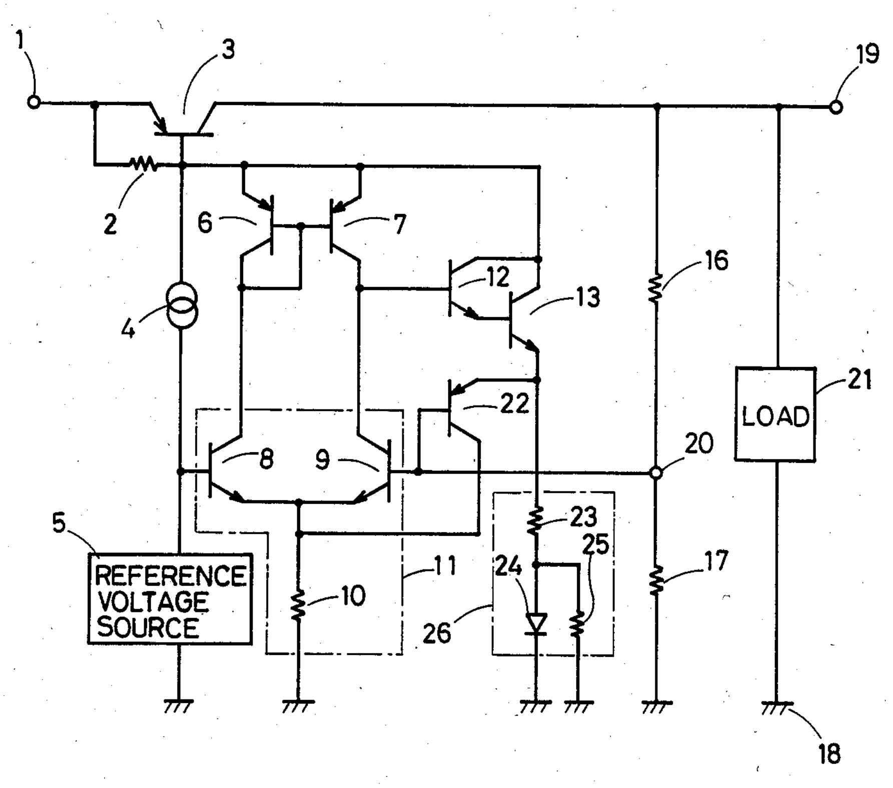
FIG. 2 is a circuit diagram showing a preferred embodiment of a constant-voltage power supply circuit according to the present invention.

FIG. 2 is a circuit diagram showing a preferred embodiment of a constant-voltage power supply circuit according to the present invention. In FIG. 2, reference numerals identical to those in FIG. 1 indicate corresponding components, and thus explanation thereof is omitted.

The emitter of a current limitation detecting PNP transistor 22 and the emitter of an NPN transistor 13 for controlling the base bias of the control PNP transistor 3 are interconnected, and a current detecting resistor 23 is connected to the junction therebetween. Between the current detecting resistor 23 and a ground, there is connected a diode 24 in the forward direction. The diode 24 is connected in parallel with a resistor 25. The resistor 25, the current detecting resistance 23 and the diode 24 form a current detecting circuit 26. The base of the current limitation detecting PNP transistor 22 is connected to an output voltage regulating terminal 20, while the collector thereof is connected to an emitter resistance 10 of NPN transistors 8 and 9 forming an error amplification circuit 11. The emitter of the current limitation detecting PNP transistor 22 is grounded through the current detection circuit 26. The resistor 25 is provided to cope with temperature change.

Operation of the embodiment as shown in FIG. 2 is now described. It is assumed here that the voltage $V_{ref}$ of a reference voltage source 5 is 1.2 V, the current limitation value $I_{Lmax}$ of an NPN transistor 13 for controlling the base bias of the transistor 3 is 100 mA and the forward direction voltage $V_F$ of the diode 24 in the current detection circuit 26 is 0.8 V. The value of the current detection resistor 23 is determined as follows, considering that it is satisfactory that the resistor 23 produces a voltage sufficient for turning the current limitation detecting PNP transistor 22 on when applied a current of 100 mA. Assuming that the base-to-emitter voltages of the NPN transistors 8 and 9 forming the error amplification circuit 11 are equal and the base-to-emitter voltage $V_{BE}$ of the current limitation detecting PNP transistor 22 to be turned on is 0.5 V, the value of the current detecting resistor 23 is:

$$\frac{(Vr + V_{BE}) - V_F)}{I_{Lmax}} = \frac{(1.2 \text{ V} + 0.5 \text{ V}) - 0.8 \text{ V}}{100 \text{ mA}} = 9\ \Omega$$

The current detecting resistor 23 prevents an overcurrent in the following manner: When the current flowing through the NPN transistor 13 exceeds 100 mA, the current limitation detecting PNP transistor 22 is turned on, and the collector current thereof in turn flows to the emitter resistor 10 of the NPN transistors 8 and 9 forming the error amplification circuit 11. By virtue of this, the emitter potentials of the NPN transistors 8 and 9 are increased, while the collector currents thereof are decreased. As the result, the current flowing to the base of the bias control NPN transistor 12 is decreased and the current flowing to the bias control NPN transistor 13 is decreased to be maintained at 100 mA. Thus, the base bias of the PNP transistor 3 is controlled, and consequently the current flowing to the PNP transistor 3 is maintained at a constant value.

Further, when the load end (between the output terminal 19 and the ground 18) is short-circuited, the potential of the output voltage regulating terminal 20 is lowered approximately to the ground potential and thus the base potential of the current limitation detecting PNP transistor 22 is lowered to a similar value. Therefore, the PNP transistor 22 is transferred to an on condition, and the collector current thereof flows to the emitter resistor 10 of the NPN transistors 8 and 9 in the error amplification circuit 11. Consequently, the emitter potential of the NPN transistor 8 forming the error amplification circuit 11 is increased so that the collector current thereof is decreased. Assuming that the collector-to-emitter voltage $V_{CE}$ of the current limitation detecting PNP transistor 22 in operation is 0.15 V, the base-to-emitter voltage $V_{BE(8)}$ of the NPN transistor 8 whose collector current is decreased is 0.6 V and the forward direction voltage $V_F$ of the diode 24 at that time is 0.7 V, the current flowing to the collector of the transistor 13 in short-circuiting of the load end is:

$$\frac{Vr - V_{BE(8)} + V_{CE} - V_F}{9\,\Omega} = \frac{1.2 - 0.6 + 0.15 - 0.7}{9\,\Omega} = 5.6\text{ mA}$$

This value is remarkably small, i.e., approximately 1/20 in comparison with a general limitation level. Thus, since the base bias of the PNP transistor 3 is decreased, the current flowing to the collector thereof is remarkably reduced approximately to 1/20 of that in the general limitation case.

Since, as hereinabove described, it is conveniently utilized, by using the diode 24 in the current detection circuit in addition to the resistors, that the forward direction voltage $V_F$ of the diode 24 is not significantly changed with respect to the current change, the collector current of the NPN transistor 13 can be reduced to a small level of about 1/20, e.g., 5.6 mA in case of short-circuiting of the load end with respect to a general limitation level of 100 mA.

Although the current level is reduced to about 1/20 in the aforementioned example, it is sufficiently effective to reduce the same to, as a standard, 1/10 in practice. For example, in an integrated circuit having a maximum rated load current of 100 mA, the limitation value of the overcurrent is generally determined at 150 to 200 mA. Being considered to be under ½ of the maximum rated value in a practical working condition, the actual load current value is about 40 to 50 mA. Since, when the load end is short-circuited under such a condition, the output end is grounded, the power supply circuit is directly supplied with the input voltage. If, for example, the power supply circuit is used with an input voltage of 20 V and an output voltage of 10 V, the power supply circuit is supplied in a steady state with an electric power of 400 to 500 mW which is the product of the input-output voltage difference of 10 V and the load current of 40 to 50 mA, most of which is applied to the PNP transistor 3. With respect to this, the power is increased by the direct application of the input voltage of 20 V upon short-circuiting of the load end. Therefore, if the current flowing to the PNP transistor 3 during the short-circuiting of the load can be reduced to 1/10 of the limitation current of 150 to 200 mA, the power applied to the PNP transistor 3 at that time is 20 V×(15 to 20 mA)=300 to 400 mW, and thus the power can be controlled to be under the level at the steady state.

It is to be noted that the resistor 25 connected to the current detecting diode 24 functions to cope with the temperature change. For example, when the temperature is lowered to −50° C., the forward direction voltage $V_F$ of the diode 24 is increased by about 150 mV in comparison with the normal temperature of +25° C. since the value $V_F$ is increased by about 2 mV per 1° C.

Therefore, if the voltage Vr at the reference voltage source 5 is maintained at 1.2 V without change, the current limitation level at this time during the short-circuiting of the load becomes, calculated by:

$$\frac{Vr - V_{BE(8)} + V_{CE} - V_F}{9\,\Omega},$$

under 100 μA which is the minimum current value of a balanced level. Consequently, the power supply circuit might not return to its original state after the load end short circuit is removed. However, by connecting the resistor 25 in a parallel manner to the diode 24, there flows a bleeder current at the value of $V_F$/(resistance value at the resistor 25), i.e., a divided current flowing in parallel for stabilization without regard to the temperature change. For example, there necessarily flows a bleeder current at the value of 3.5 mA with respect to 700 mV/200, 2.5 mA with respect to 500 mV/200 and 4.25 mA with respect to 850 mV/200. Since the bleeder current flowing to the resistor 25 is not significantly changed even if the current flowing to the diode 24 is largely changed, the power supply circuit necessarily returns to its original state after the load end short circuit is removed.

In the aforementioned embodiment, the emitter of the current limitation detecting PNP transistor 22 may be connected to the base of the control NPN transistor 13. Since, in this case, the emitter potential of the PNP transistor 22 is increased by the value of the base-to-emitter voltage $V_{BE}$ of the transistor 13, the operation of the PNP transistor 22 is quickened by the increase. In other words, the emitter of the transistor 22 is supplied from the beginning with a voltage of about 1.2 V which is the sum of the forward direction voltage of the diode 24 and the base-to-emitter voltage $V_{BE}$ of the transistor 13 in this case. Further, assuming that the base-to-emitter voltages of the transistors 8 and 9 are equal, the base potential of the transistor 22 is 1.2 V, which is equal to that of the reference voltage source 5. Thus, assuming that the transistor 22 is turned on when the base-to-emitter voltage $V_{BE}$ becomes 500 mV, the current to be flowed to the resistor 23 so as to turn the transistor 22 on is controlled to 500 mV/$R_{23}$, wherein $R_{23}$ is the resistance value of the resistor 23. The current limitation level can thus be further decreased in such a manner.

Further, though the collector of the current limitation detecting PNP transistor 22 is connected to the emitters of the NPN transistors 8 and 9 forming the error amplification circuit 11 in the aforementioned embodiment, the emitter resistance 10 may be divided so that the subject collector may conveniently be connected to the dividing point.

As hereinabove described, according to the preferred embodiment of the present invention, the base of the current limitation detecting transistor is connected to the output voltage regulating terminal and the collector thereof is connected to the emitter of the error amplification transistor while the emitter thereof is connected to the current detecting circuit consisting of the diode connected in series to the resistor and the resistor connected in parallel thereto, so that the current limitation value during load end short circuit is reduced to a small level under 1/10 of a normal current limitation value and the power supply circuit operates in a stabilized manner against temperature change, and thus the present invention is remarkably effective in practice. Further, since additionally the load end short circuit can be detected, the present invention is significantly advantageous in that it has a function to cope with the load end short circuit in addition to the current limiting function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A constant-voltage power supply circuit including an improved current limiting protective circuit, said constant-voltage power supply circuit comprising:
- a power supply terminal connected to a power source;
- a load terminal connected to a load;
- a control transistor connected between said power supply terminal and said load terminal for feeding said load with a controlled load current;
- a voltage stabilization means for changing the base bias of said control transistor in response to a voltage applied to said load, thereby stabilizing said voltage applied to said load; and
- a current control means for detecting the time when said load current flowing to said control transistor exceeds a predetermined current value and changing said base bias of said control transistor, thereby controlling said load current not to exceed said predetermined current value, said current control means being adapted to detect the time when the potential of said load terminal is lowered to a predetermined potential value and change said base bias of said control transistor, thereby to decrease said load current to a current value under said predetermined current value.

2. A constant-voltage power supply circuit in accordance with claim 1, wherein said predetermined potential is approximately 0 V.

3. A constant-voltage power supply circuit in accordance with claim 1, wherein said voltage stabilization means includes:
- a reference voltage source for generating a reference voltage;
- a comparing means for comparing said voltage applied to said load with said reference voltage; and
- a bias control transistor for changing said base bias of said control transistor in response to said comparing means.

4. A constant-voltage power supply circuit in accordance with claim 3, wherein said bias control transistor includes a pair of Darlington-connected transistors.

5. A constant-voltage power supply circuit in accordance with claim 3, wherein said current control means includes:
- a current detection means for detecting the time when said current flowing to said bias control transistor exceeds a predetermined constant value; and
- a current control detecting transistor being turned on in response to detection by said current detecting means as well as being turned on when the potential of said load terminal is decreased to said predetermined potential value, thereby performing control operation so that said current flowing through said bias control transistor is decreased.

6. A constant-voltage power supply circuit in accordance with claim 5, wherein
- said comparing means includes a pair of transistors in which the base of one transistor is connected with respect to said reference voltage source, the base of the other transistor is connected with respect to said load terminal and emitters of both transistors are connected with each other,
- said bias control transistor has a base connected with the collector of said other transistor, a collector connected with the base of said control transistor and an emitter connected to said current detecting means; and
- said current control detecting transistor has a base connected with respect to said load terminal, an emitter connected to the emitter of said bias control transistor and a collector connected to interconnected emitters of said pair of transistors.

7. A constant-voltage power supply circuit in accordance with claim 5, wherein said current detecting means includes a resistor and a diode connected in series between said bias control transistor and a ground.

8. A constant-voltage power supply circuit in accordance with claim 7, wherein said current detecting means further includes a resistor connected in parallel to said diode.

9. A constant-voltage power supply circuit in accordance with claim 6, wherein said comparing means further includes an emitter resistor connected between said interconnected emitters of said pair of transistors and a ground.

10. A constant-voltage power supply circuit in accordance with claim 9, wherein said emitter resistor is divided, and said collector of said current control detecting transistor is connected to the dividing point thereof.

11. A constant-voltage power supply circuit in accordance with claim 6, wherein said emitter of said current control detecting transistor is connected with said base of said bias control transistor.

* * * * *